F. SOUTHWICK.
TIRE TURNING DEVICE.
APPLICATION FILED AUG. 28, 1919.
1,345,644. Patented July 6, 1920.
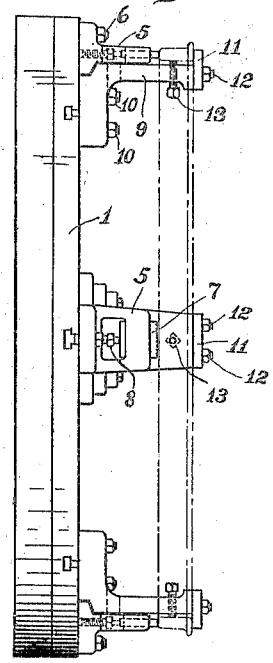
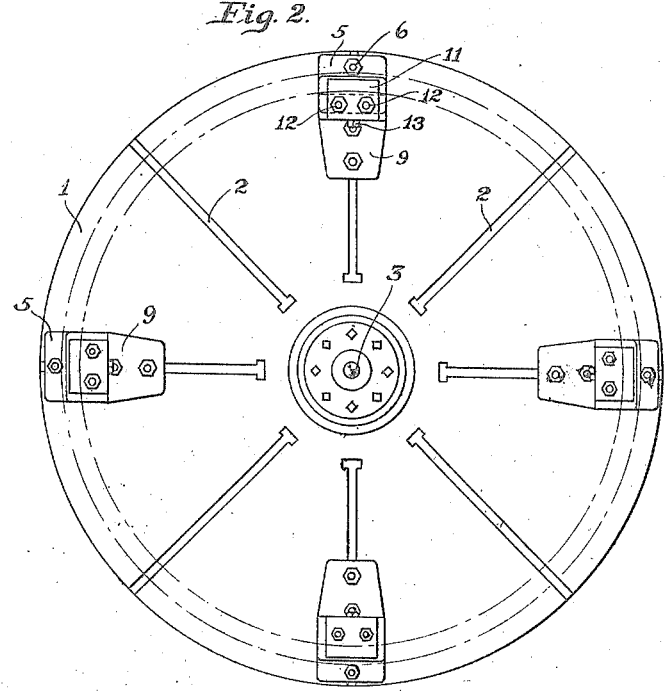
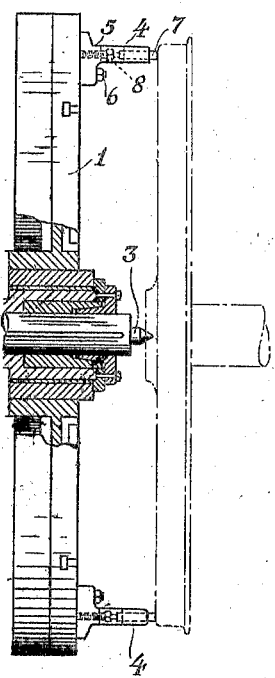
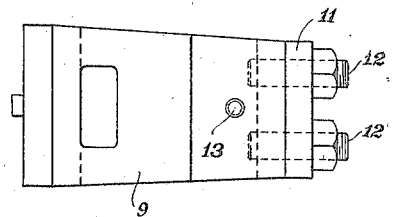
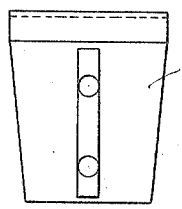
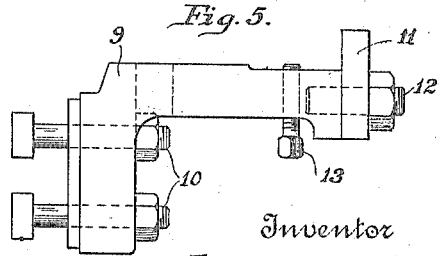
Inventor
Frank Southwick
By S. Jay Teller
Attorney.

UNITED STATES PATENT OFFICE.

FRANK SOUTHWICK, OF KANSAS CITY, KANSAS, ASSIGNOR TO NILES-BEMENT-POND COMPANY, OF NEW YORK, N. Y., A CORPORATION OF NEW JERSEY.

TIRE-TURNING DEVICE.

1,345,644.     Specification of Letters Patent.     Patented July 6, 1920.

Application filed August 28, 1919. Serial No. 320,331.

*To all whom it may concern:*

Be it known that I, FRANK SOUTHWICK, a citizen of the United States, residing at Kansas City, in the county of Wyandotte and State of Kansas, have invented certain new and useful Improvements in Tire-Turning Devices, of which the following is a specification.

In many railroad repair shops it is quite common, when a locomotive is to have only minor repairs, to jack up the locomotive and to heat the tires and remove them from the wheel centers. Then the tires are properly trued up in a suitable machine. This invention relates to devices adapted to be used in conjunction with wheel lathes for the purpose of holding such demounted tires in position so that they can be turned on a wheel lathe in the same way that tires are ordinarily turned when mounted on their wheels. In accordance with the invention, I provide supplemental tire engaging brackets which are constructed and arranged to hold the tire so that it can be driven by the ordinary driving devices.

In the accompanying drawing, which shows the preferred embodiment of the invention, Figure 1 is a front view showing a lathe face plate together with the tire holding brackets and drivers.

Fig. 2 is a front view of the parts shown in Fig. 1.

Fig. 3 is a view somewhat similar to Fig. 1 but showing a wheel and axle supported in the usual way by the lathe center.

Figs. 4, 5 and 6 are detail views of the tire engaging bracket.

Referring to the drawing, 1 represents the face plate of a lathe which may be of any usual or preferred construction. As shown, this face plate is provided with radial T-slots 2—2. The lathe is provided with a center 3 which ordinarily serves to engage the wheel axle and support the wheel and tire in position to be turned, as illustrated in Fig. 3.

For driving the wheel and tire there are provided driving devices 4 of which any desirable or necessary number may be provided. Ordinarily four are used. So far as my invention is concerned, the details of the drivers 4 may be changed, but I prefer a construction similar to that illustrated in Patent 853,273 to Daniel H. Teas for lathe driver.

As shown in the said patent, and as herein illustrated, the driver comprises a frame 5 which is adapted to be secured to the face plate by means of one or more bolts 6 entering one of the T-slots. Slidably mounted in the slot in the frame 5 is a serrated block 7 adapted to directly engage the side of the wheel or the tire. For forcing the block 7 outward there is provided a screw 8 which is threaded into the frame 5 and which engages the inner edge of the block 7. It will be seen that when the screw is turned the block 7 may be moved outward to force the teeth thereof against the wheel or the tire in such a way as to effect a powerful driving action when the face plate is turned.

In order to engage the tire at the side opposite the face plate I provide suitable brackets which are preferably rigid in construction and which are adapted to hold the outermost face of the tire at a fixed predetermined distance from the face plate. Preferably in order to utilize the same drivers 4 which are ordinarily used for driving the wheel and the tire together, as shown in Fig. 3, I make the tire engaging brackets supplemental to and independent of the drivers 4. As shown generally in Figs. 1 and 2 and in detail in Figs. 4 to 6 the brackets are indicated at 9. One of these brackets is mounted adjacent each driver, being held by bolts 10 entering the corresponding T-slot in the face plate. Each bracket 9 is preferably rigid and it extends through the tire and is provided with a lip 11 which is preferably formed as a separate piece of metal held by bolts 12. The lip is adapted to engage the tire at the side opposite the face plate. Preferably each bracket 9 is provided with a suitable device for engaging the inner surface of the tire to assist in centering it. As shown, each bracket has a screw 13 for this purpose. It will be seen that by means of the several screws 13 on the respective brackets, the tire can be adjusted to central position. The several lips 11 serve as abutments for the tire to hold it in the same position in which it would be held by its wheel, as shown in Fig. 3. The tire being thus held and centered by the brackets, it is engaged by the drivers 4 which act exactly in the way already described to press the tire laterally against the said brackets.

It will be seen that this construction makes it possible for the same machine to be used interchangeably for turning the tires on their wheels or demounted tires. No adjustment of the cutting tools is necessary, and all that is needed to be done is to reverse the drivers, as indicated in Fig. 1, and to put the several brackets 9 in place. The drivers can exert the same powerful driving action which they exert where used in the usual way, and just as heavy a cut can be taken on the demounted tires as on the mounted ones. Inasmuch as the brackets engage the tires at the faces thereof which are opposite the face plate the tires are held in proper relation to the cutting tools notwithstanding variations in the widths of the tires.

What I claim is:

1. The combination with a wheel lathe face plate, of a plurality of brackets secured to the face plate and adapted to engage a tire at the side opposite the face plate and at a fixed predetermined distance therefrom, and a plurality of drivers carried by the face plate and adapted to engage the tire at the side adjacent the face plate and to press the tire laterally against the said brackets.

2. The combination with a wheel lathe face plate, of a plurality of brackets secured to the face plate and adapted to engage a tire at the side opposite the face plate and at a fixed predetermined distance therefrom, and a plurality of drivers secured to the face plate independently of the brackets and adapted to engage the tire at the side adjacent the face plate and to press the tire laterally against the said brackets.

3. The combination with a wheel lathe face plate, of a plurality of rigid brackets secured to the face plate and adapted to engage a tire at the side opposite the face plate and at a fixed predetermined distance therefrom, means on the brackets for engaging the inner surface of the tire to center it, and a plurality of drivers carried by the face plate and adapted to engage the tire at the side adjacent the face plate and to press the tire laterally against the said brackets.

4. The combination with a wheel lathe face plate, of a plurality of brackets secured to the face plate and adapted to engage a tire at the side opposite the face plate and at a fixed predetermined distance therefrom, means on the brackets for engaging the inner surface of the tire to center it, and a plurality of drivers secured to the face plate independently of the brackets and adapted to engage the tire at the side adjacent the face plate and to press the tire laterally against the said brackets.

5. The combination with a wheel lathe face plate, of a plurality of brackets secured to the face plate and adapted to engage a tire at the side opposite the face plate and at a fixed predetermined distance therefrom in the same position that it would occupy if in place on a wheel mounted on an axle and supported on the lathe centers, and a plurality of drivers carried by the face plate and adapted to engage the tire at the side adjacent the face plate and to press the tire laterally against the said brackets.

6. The combination with a wheel lathe face plate, of a plurality of brackets secured to the face plate and adapted to engage a tire at the side opposite the face plate and at a fixed predetermined distance therefrom in the same position that it would occupy if in place on a wheel mounted on an axle and supported on the lathe centers, and a plurality of drivers secured to the face plate independently of the brackets and adapted to engage the tire at the side adjacent the face plate and to press the tire laterally against the said brackets.

7. The combination of a tire supporting bracket adapted to be rigidly secured to the face plate of a wheel lathe, an outward projecting lip on the bracket adapted to engage a tire at the side thereof opposite the face plate, and an outward projecting screw in the body of the bracket adapted to engage the inner surface of the tire to assist in centering it.

In testimony whereof I hereto affix my signature.

FRANK SOUTHWICK.